United States Patent
Paschkewitz et al.

(10) Patent No.: US 9,486,960 B2
(45) Date of Patent: Nov. 8, 2016

(54) SYSTEM FOR DIGITAL FABRICATION OF GRADED, HIERARCHICAL MATERIAL STRUCTURES

(71) Applicant: PALO ALTO RESEARCH CENTER INCORPORATED, Palo Alto, CA (US)

(72) Inventors: John Steven Paschkewitz, San Carlos, CA (US); Gabriel Iftime, Dublin, CA (US); Victor Alfred Beck, Menlo Park, CA (US); David Mathew Johnson, San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 14/578,044

(22) Filed: Dec. 19, 2014

(65) Prior Publication Data

US 2016/0176111 A1    Jun. 23, 2016

(51) Int. Cl.
| | |
|---|---|
| B29C 47/06 | (2006.01) |
| B29C 67/00 | (2006.01) |
| B33Y 30/00 | (2015.01) |
| B29K 101/10 | (2006.01) |

(52) U.S. Cl.
CPC ....... *B29C 67/0085* (2013.01); *B29C 67/0059* (2013.01); *B29K 2101/10* (2013.01); *B33Y 30/00* (2014.12)

(58) Field of Classification Search
CPC ..................................................... C08L 25/12
USPC .............. 347/1, 2, 3, 9; 264/176.1; 700/119; 427/2.24
See application file for complete search history.

(56) References Cited

U.S. PATENT DOCUMENTS

| | | | |
|---|---|---|---|
| 4,271,112 A | 6/1981 | Rossman et al. | |
| 4,505,777 A | 3/1985 | Richter | |
| 5,580,512 A | 12/1996 | Koon et al. | |
| 6,025,285 A | 2/2000 | Vyakarnam et al. | |
| 6,123,882 A | 9/2000 | Uchida | |
| 7,182,815 B2 * | 2/2007 | Katagami et al. | 118/665 |
| 7,951,464 B2 | 5/2011 | Roberts | |
| 2005/0074993 A1 | 4/2005 | Alam et al. | |
| 2011/0079936 A1 | 4/2011 | Oxman | |
| 2014/0255646 A1 | 9/2014 | Greiss et al. | |

FOREIGN PATENT DOCUMENTS

WO    9813185    4/1998

OTHER PUBLICATIONS

Studart, Andre R., "Biological and Bioinspired Composites with Spatially Tunable Heterogeneous Architectures," Advanced Functional Materials 2013, DOI: 10.1002/adfm.201300340, 14 pages.
Bar-On, et al., "Multiscale Structural Gradients Enhance the Biomechanical Functionality of the Spider Fang," Nature Communications 2014, 5:3894, 8 pages.

(Continued)

*Primary Examiner* — Lam Nguyen
(74) *Attorney, Agent, or Firm* — Marger Johnson

(57) ABSTRACT

A system to fabricate hierarchical graded materials includes a reservoir to contain a material to be deposited, a print head connected to the reservoir to allow the print head to receive the material to be deposited, the print head having a mixing section, and an actuator connected to the print head, the actuator configured to actuate the print head in six axes of motion.

8 Claims, 11 Drawing Sheets

(56) References Cited

OTHER PUBLICATIONS

Compton and Lewis, "3D-Printing of Lightweight Cellular Composites," Advanced Functional Materials 2014, 26:5930-5935.
Holmes Jr., Larry R., "Micro-Composite Fabrication via Field-Aided Laminar Composite (FALCom) Processing," Army Research Laboratory, Sep. 2012, ARL-TR-6106.
Kalaitzidou, et al., "Laser Sintering vs. Melt Compounding: A New Approach for Functionally Graded Polymer Nanocomposites," G.W. Woodruff School of Mechanical Engineering, Georgia Institute of Technology, 10 pages.
Mott and Evans, "Zirconia/alumina functionally graded material made by ceramic ink jet printing," Materials Science and Engineering A271 (1999) 344-352.

* cited by examiner

SYSTEM FOR DIGITAL FABRICATION OF GRADED, HIERARCHICAL MATERIAL STRUCTURES

TECHNICAL FIELD

This disclosure relates to fabrication of multi-scale heterogeneous materials, more particularly to fabrication of these materials from colloidal elements using a microfluidic print head and a robotic deposition system.

BACKGROUND

Fabricating hierarchical, multi-material structures offers tremendous promise for controlling and tailoring material properties. An example that highlights both the potential and the challenges of hierarchical, multi-material structures is discussed in "Simultaneously High Stiffness and Damping in Nanoengineered Microtruss Composites," *ACS Nano*, Mar. 12, 2014, pp. 3468-3475. The microtruss composite possesses the contradictory design goals of high stiffness and high damping. These structures have sound absorbing qualities in cars and airplanes while also being strong. Fabrication of these structures involves the growing of carbon nanotubes (CNTs) from a steel plate and coating with alumina using traditional semiconductor processes, followed by multiple deposition steps to build a polyurethane/clay layer on the CNTs and finally encapsulation with polyurethane. This material is graded with the interface between the polymer and CNT microtruss composed of a nano-composite polymer that has intermediate properties, which is important for overall mechanical robustness. However, this method is not scalable to large areas or digital.

US Patent Publication 2011/0079936, to Oxman, explores concepts on digitally printing graded materials using dye in a FDM (fused deposition modeling) print head. The disclosure teaches 'on the fly' blending of materials for creating continuous gradients in material properties. However, this concept does not have the capability to build multiscale structures or heterogeneous material structures required to achieve the full potential of architected materials.

SUMMARY

Embodiments include a system to fabricate hierarchical graded materials include a reservoir to contain a material to be deposited, a print head connected to the reservoir to allow the print head to receive the material to be deposited, the print head having a flow focusing section, and a mixing section, and an actuator connected to the print head, the actuator configured to actuate the print head in six axes of motion. Further embodiments have a print head including a reactive bonding section and a fluidic particle alignment section.

DETAILED DESCRIPTION OF THE EMBODIMENTS

The following discussion will use several terms that have particular meanings when used here. A 'hierarchical material' is a material having structures spanning multiple orders of magnitude of length scale. A 'graded material' is a material having a continuous and smooth spatial gradient of composition. A 'digital material' has controlled spatial composition and form. The unit of a digital material is a voxel, which is a three-dimensional droplet or characteristic volume of material. A 'multi-material composite' is a material composed of a suspending material, usually a polymer, also known as a resin, and a dispersed particulate reinforcing material. The reinforcing material may comprise of colloidal clays, carbon nanotubes, or macroscopic additives like carbon fibers or ceramic platelets.

Figure 1:
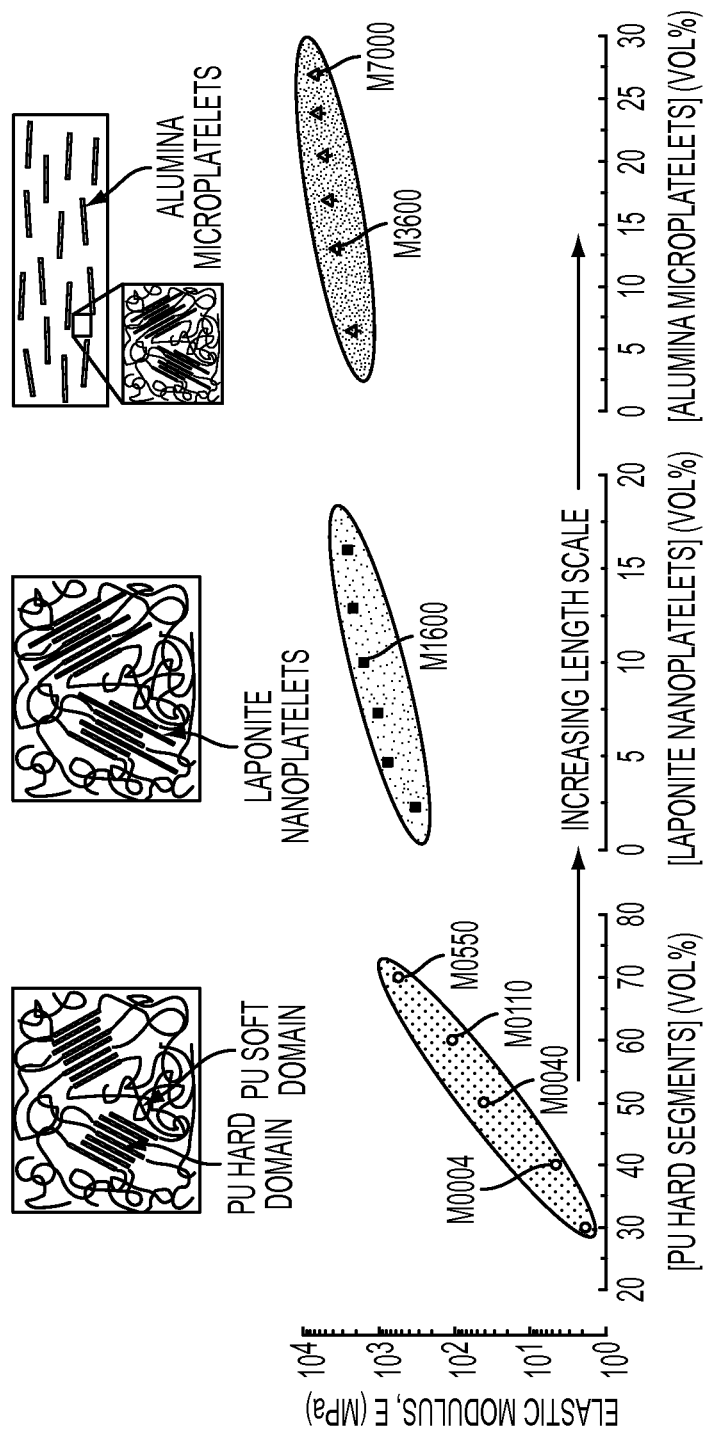
FIG. 1 shows a graph illustrating an example of hierarchical graded material.

Merely as an example to illustrate materials that have some of these properties, polyurethane-based composites have been formulated that are hierarchically reinforced with hard polymeric crystalline domains, laponite nanoplatelets and alumina microplatelets at progressively larger length scales. By controlling the concentration of such building blocks within the polymer matrix, it is possible to change the elastic modulus of polyurethane-based composites within a very broad range spanning over four orders of magnitude. FIG. 1 shows a graph of this material. Extreme gradients in mechanical properties within the same material approaches the range of elastic moduli found in highly graded natural composites and is far beyond the span of properties obtainable in metal/ceramic functionally graded materials. This graph is from a paper, "Biological and Bioinspired Composites with Spatially Tunable Heterogeneous Architectures," *Advanced Functional Materials*, 2013, by Professor A. R. Studart, (www.wileyonlinelibrary.com).

Figure 2:
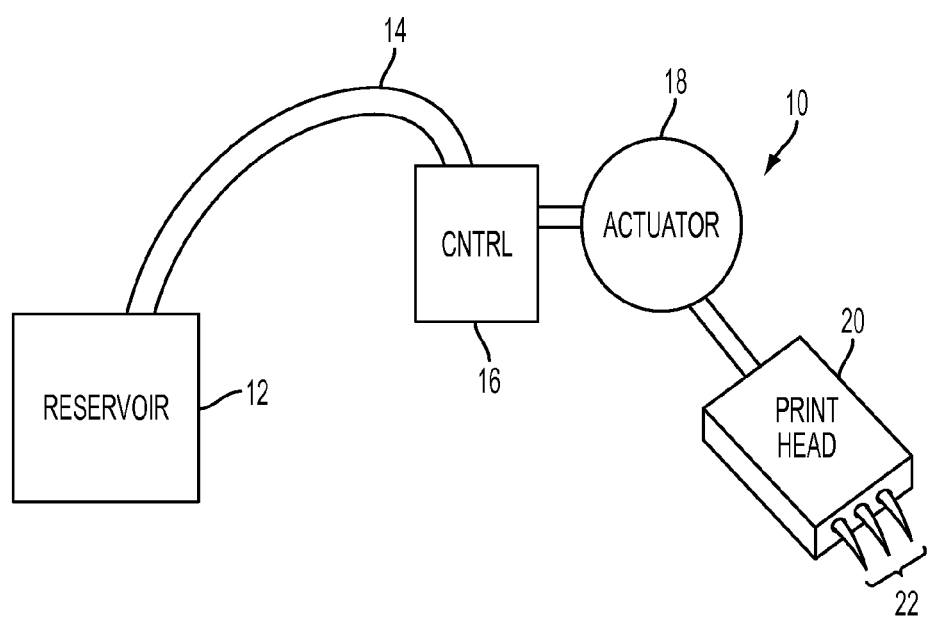
FIG. 2 shows an embodiment of a system to fabricate hierarchical graded materials.

FIG. 2 shows an embodiment of a system to digitally fabricate multi-scale, or hierarchical, heterogeneous materials using novel microfluidic print heads coupled to colloidal manipulation chemistry and a robotic deposition system. The system may take many forms and the embodiment of FIG. 2 is merely one example. The embodiment of FIG. 2 has a reservoir 12 in which functional colloidal particles are provided to the print head to be printed on the final substrate. An umbilical or conduit such as 14 allows the material to flow from the reservoir to a local reservoir attached to the print head. A controller 16 will regulate the flow of the material to the print head and the motion of the actuator 18.

The actuator 18 has the capability to move the print head 20 in 6 axes of motion, forward/backward, up/down, left/right, on the three perpendicular axes, as well as the three rotational axes, also known as pitch, yaw and roll. This facilitates both the mixing and oriented deposition as will be discussed in more detail later. The print head 20 will typically have multiple nozzles, such as 22, to allow deposition of the materials.

The mixer that has a desired output of a continuous profile of composition versus time. The changes in composition occur at a spatial resolution equal to a voxel. This change in composition has implications for the volume residence time and residence time distribution. The 'residence time' is the time between the functional materials entering the print head and exiting the nozzle. The residence time varies for different materials as they move through the print head at different rates. The 'residence time distribution' (RTD) of a chemical reactor is a probability distribution function that describes the amount of time a fluid element could spend inside the reactor. The below discussion is merely an illustrative example and is in no way intended to limit the embodiments disclosed here.

In this example, an output of the printer is assumed to be a line of material with a square cross section that has a height and width equal to the voxel size, which is 100 microns (1e-4m). The discussion also assumes that the linear deposition rate is 1 cm/s or 1e4 microns/sec, or 100 voxels/second. Each voxel has a specified composition state, specifically by a volume percentage of material A and B, as examples. Each voxel must have a composition that is homogeneously mixed and defined. "Homogeneously mixed" means materials A and B are homogeneously distributed through the voxel such that there are no localized areas in the voxel with a higher or lower amount of A and B than what is desired in the voxel overall. "Defined" means that the specified composition and the actual composition of the voxel are the same.

For the voxel to be homogeneously mixed, the mixer should be able to process a single voxel of a material that is a 100×100×100 micron cube and fully mix it in the time required to deposit the material at a rate of 100 voxels/sec, 0.01 seconds. Alternatively, the mixer must be able to 'queue' a number of voxels and mix them in such a way that each 100×100×100 micron cube of material that exits the mixer is at the specified composition state desired in the part buildup. This latter configuration relaxes the mixing speed requirement, the time for mixing now is the residence time of a specific voxel in the mixer, which is the number of voxels in the mixer divided by the deposition rate. If the mixer processes 100 voxels at a time, the mixing time becomes 1 second, which is more reasonable, especially for viscous liquids.

Mixing multiple voxels presents challenges for typical mixing techniques such as static or screw mixers. While this mixers achieve highly effective mixing through multiple folding, stretching and cutting operations, they also have a wide range of fluid residence times. This range of residence times results from the tortuous streamlines and near-zero flow regions within the mixer. Particles or fluid elements that sample these parts of the flow field typically have long residence times. In practice, this means that a square pulse of fluid dye typically exits the mixer with a residence time distribution that has a long tail of material that samples these low flow or tortuous path regions.

This long tail is problematic as it pollutes the voxel immediately after the one being mixed. Over many voxels, the residual material from each voxel mixing operation using a mixer with a typical RTD will cause the voxel composition to deviate significantly from what is specified, and the voxel will not be defined. Therefore, the mixer should mix materials in such a way that the RTD has no tail. Quantitatively, the RTD must be on the order of the voxel residence time itself. In this example, the RTD should be 0.01 seconds.

There are several mixing techniques that could attain both of these criteria. For example, high parallelized mixing chambers that are actuated using flexible valves, such as those employed by Quake, or acoustics could achieve both small mixing volumes with mixing and tight residence time distributions as defined above. However, these techniques have not been demonstrated using highly viscous liquids of interest to additive manufacturing.

The reservoir 12 contains functionalized particles. Using anisotropic platelets or other colloidal building blocks, different functional groups on different faces of the particle can drive interactions and assembly in a prescribed manner. The anisotropic particles may consist of platelets, chiplets, wires, etc., all of which will be referred to here as fibers. Control of the selection of the functional group on the fibers enables explicit cross-linking of colloids to each other in controlled morphologies. Using one reactive group and reaction of the resulting fibers with the resin of another achieves strong interfacial contact between the particles and matrix to provide mechanical performance.

As an example, the system can direct assembly of engineered multi-particles structures where different particles are connected in a prescribed manner as dictated by keying chemistry. This would allow creation of multi-scale reinforcement materials using chiral particles, with the chirality a function of both the particle anisotropic and keying chemistry. Chirality may enable large-scale ordering of the particles in a manner analogous to collagen fibrils seen in bone.

Examples of printable particle-reinforced composites can be found in a paper by Brent Compton and Jennifer Lewis "Printing of Lightweight Cellular Composites," *Advanced Material*, Vol. 26, pp. 5930-5935, 2014 and in the Army Research Lab technical report "Micro-composite fabrication via Field-Aided Laminar Composite (FALCom) Processing", ARL-TR-6106, September 2012. In the FalCOM system, fibers are deposited using a nozzle and then aligned using electric fields. This process is not ideal since the electrical fields required are high (kV/mm) and the particle alignment times in viscous polymeric media are on the order of 1-10s which slows overall processing speed. Lewis's work uses a much simpler extensional flow nozzle to attain particle alignment in a direction parallel to the nozzle. In the embodiments here, arbitrary particle alignment is obtained fluidically, combining the best attributes of both of these prior art systems for controlled reinforcement deposition.

Figure 3:
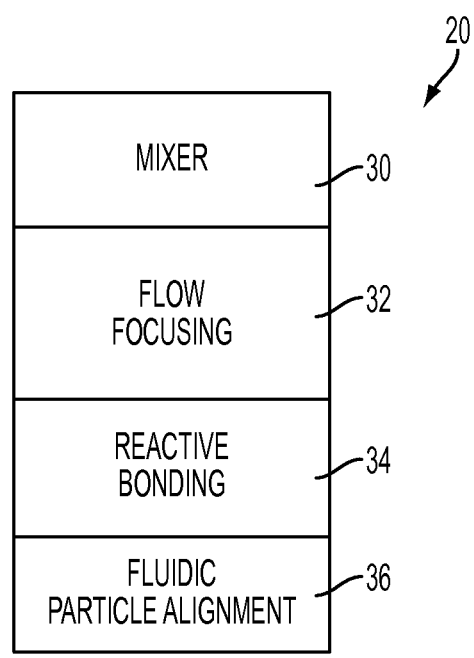
FIG. 3 shows a block diagram of a print head in a system to fabricated hierarchical graded materials.

FIG. 3 shows a more detailed view of the print head 20. The print head comprises a mixer section 30, a possible flow focusing section 32, and optional reactive bonding and fluidic particle alignment sections, 34 and 36. Each of these will be discussed in more detail in turn.

Figure 4:
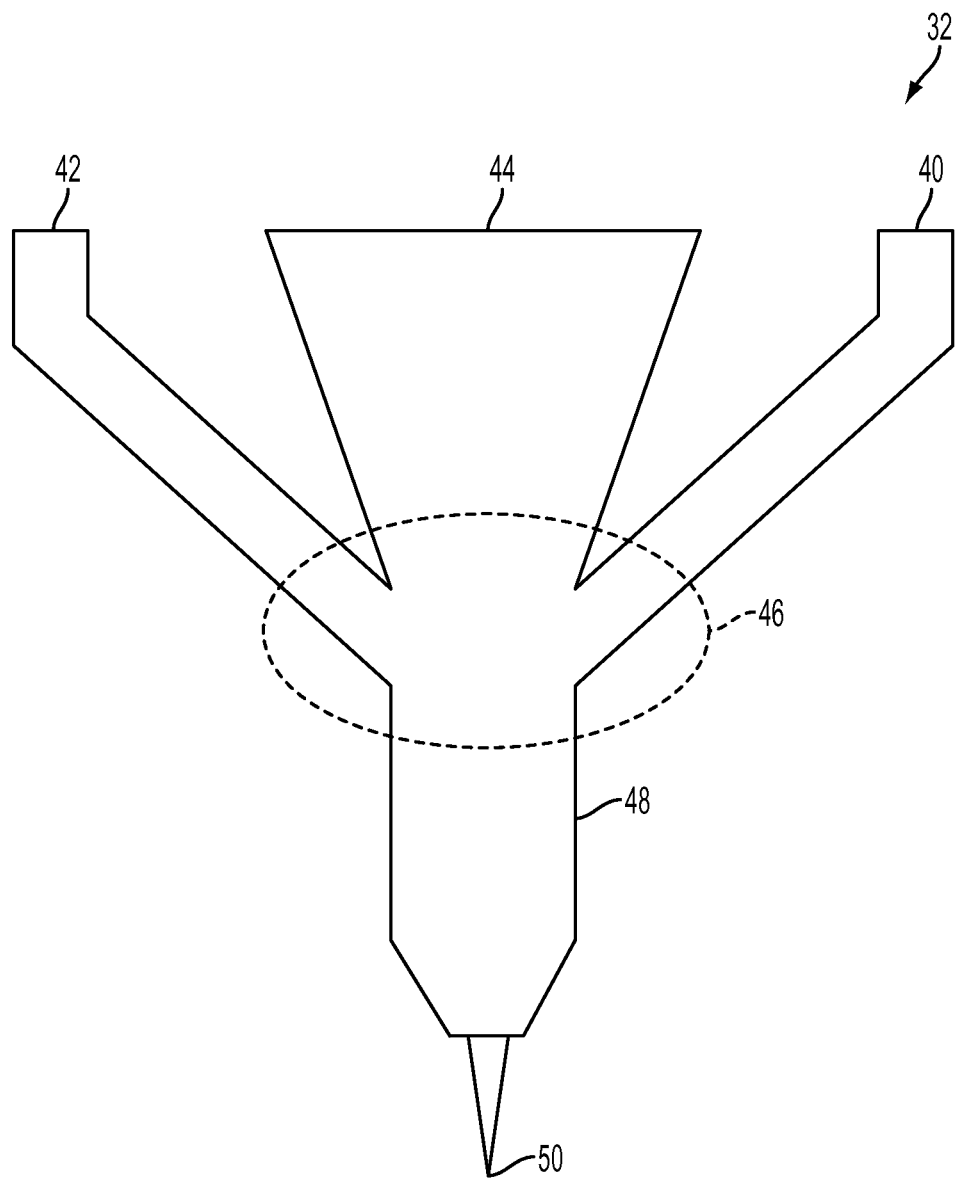
FIG. 4 shows an embodiment of a flow focusing section of a print head.

FIG. 4 shows a more detailed embodiment of an embodiment of a flow focusing section 32. The flow focusing section here provides merely one embodiment of a flow focusing section. In the embodiment of FIG. 4, the flow focusing section creates a coaxial flow of a material stream of sheathing fluids entering the section through channels 40 and 42, which will sheath the main fluid flow coming into channel 44. The sheathing occurs at region 46 where the flows come together. This highly extensional flow aligns particles, which will be important as discussed in more detail further.

Figure 5:
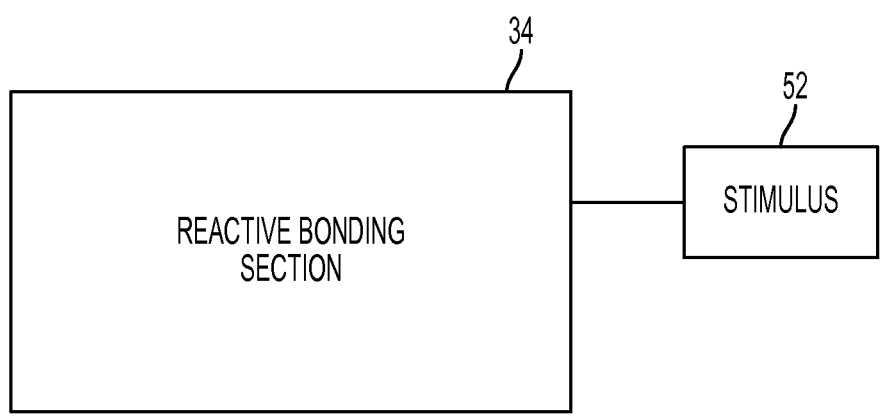
FIG. 5 shows an embodiment of a reactive bonding section of a print head.
Figure 6:
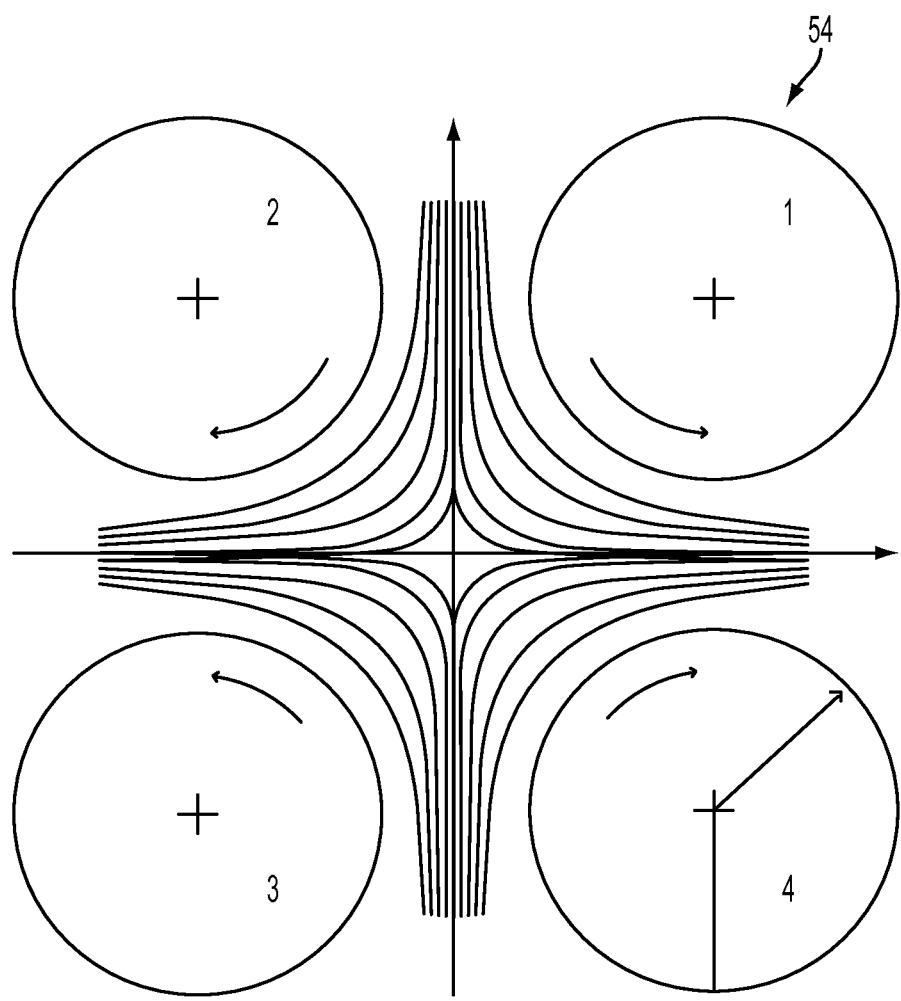
FIG. 6 shows a diagram of a four roll mill.

The flow focusing section may be followed by a reactive bonding section 32 as shown in FIG. 5. This section may be optional depending upon the materials used. One result of the reactive bonding section is a linking of the particles to form particles of varying lengths. The bonding will typically result from application of a stimulus 52. The stimulus may involve the application of heat or light, such as with a pulsed laser or localized heating. By modulating the duration of the stimulus, and the flow of the building block material, the fibers may vary in length from several hundred nanometers to millimeters. This achieves parity with existing Stable Free Radical Polymerization (SFRP) approaches. This approach may be applied to various types of colloids for which functionalization chemistries are known including silica, clays, graphene and hydroxyapatite.

Prior to the flow focusing section and the reactive bonding section, a mixer 30 mixes up the base materials. Modulating resin composition or fiber content may be achieved by using multi-layer mixers, which also make particle alignment possible. For fibers that are smaller than the orifice size (approximately 50-100 microns), fluidic systems for fiber orientation can control the straining axes of the flow. One of the most prevalent methods to control the straining axes in a flow is to use a four roll mill as shown in FIG. 5. In a four roll system such as 54 the straining axes of the flow are controlled by changing the rotation rate of the four cylinders. A linear flow ranging from pure rotation to pure extension can be generated. Fibers align along the principal straining axis in a purely extensional flow. By adding more rotation to the flow, the extensional axes are brought closer together.

As mentioned above, the flow focusing, reactive bonding, and fluidic particle alignment sections are optional. The mixer has specific performance characteristics that are compatible with digitally modulated material composition. The mixer will have the ability to modulate composition in a volume no larger than the characteristic voxel size, perform complete mixing in the volume in roughly the time required to deposit a voxel of material at the desired material deposition rate or staging of materials in such a way that mixing is complete before material deposition. The mixer will have negligible material retention and a near uniform residence time in the mixing chamber to eliminate axial dispersion or cross-contamination of subsequent voxels.

Figure 7:
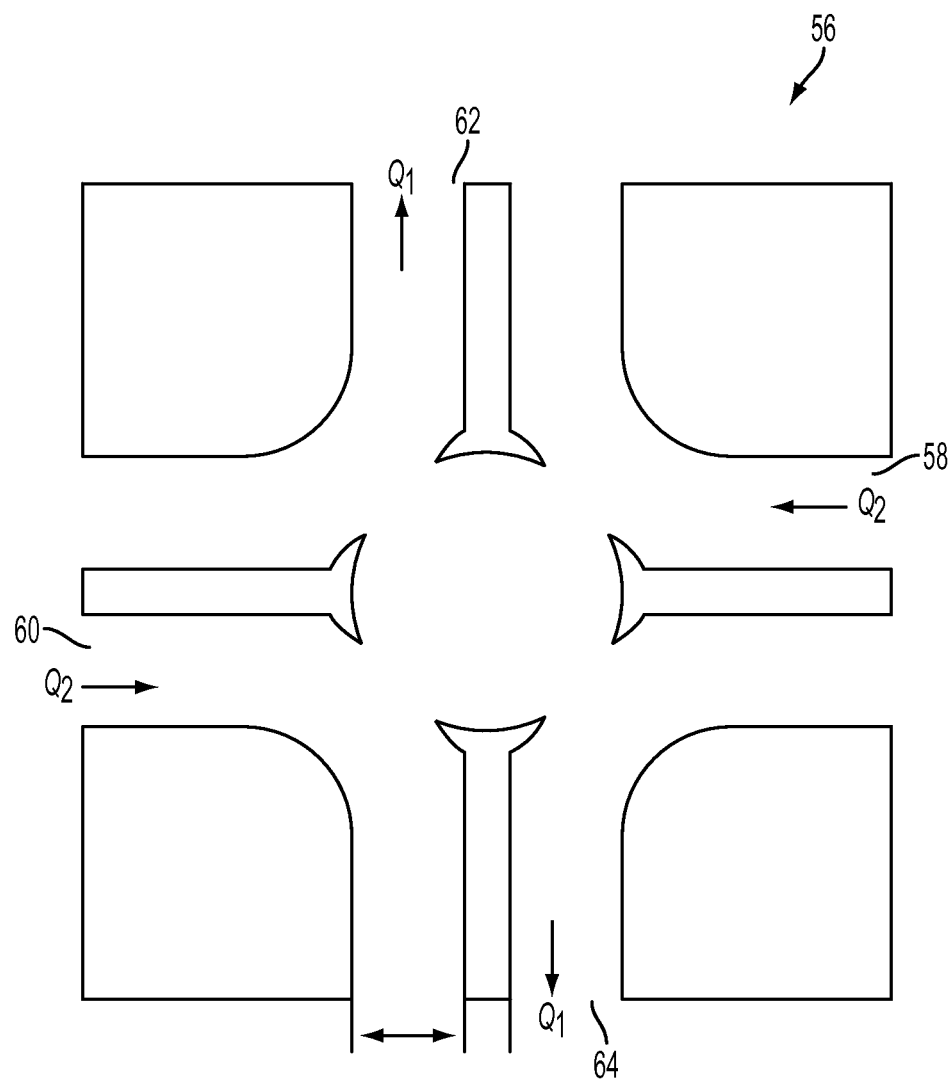
FIG. 7 shows a diagram of an embodiment of an inlet/outlet element equivalent to a four roll mill.

A fluidic equivalent of the four roll mill can be realized using carefully controlled fluidic inlet/outlet elements as shown in FIG. 7. The inlets 58 and 60 receive the material and outlets 62 and 64 similar to the areas around the cylinders of the four roll mill. Fibers will generally orient along the principal axis, the degree of rotation in the flow can be used to control fiber rotation from pure rotation to pure extension. This is merely one example of a fluidic inlet/outlet elements, other embodiments will apply within the embodiments here.

Figure 8:
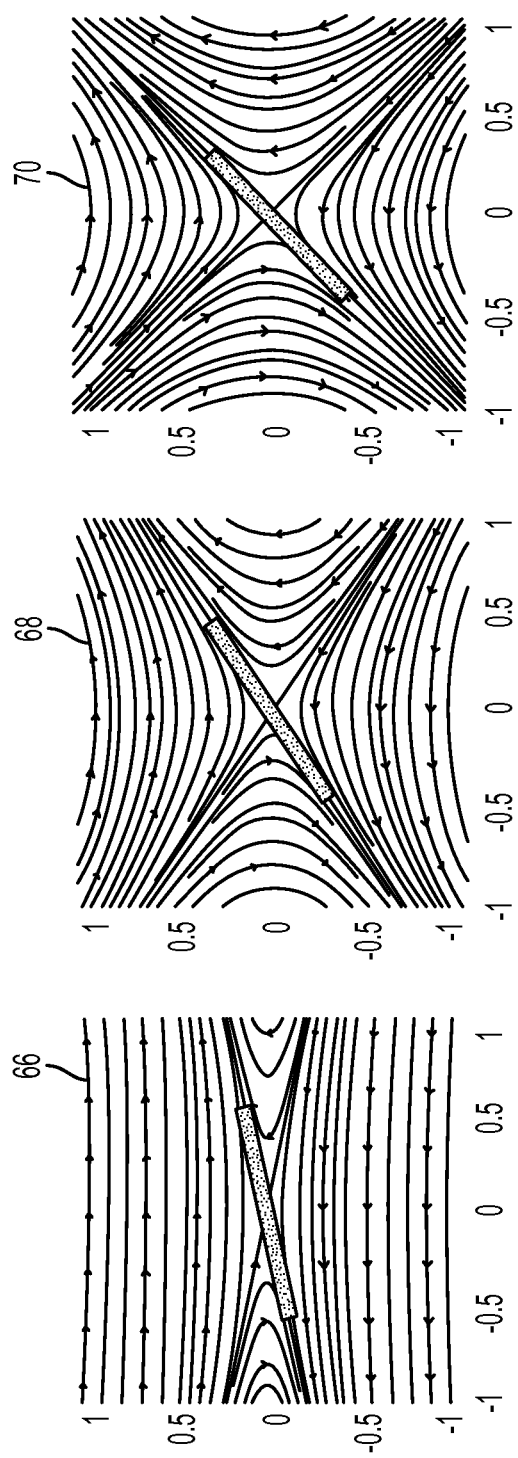
FIG. 8 show flow diagrams of modulation of a principal axis of orientation.

FIG. 8 shows how modulating the flow type parameter can change the principal straining axis. The degree of rotation of the flow is characterized by the parameter α that ranges from −1 indicating pure rotation and +1 indicating pure extension. In FIG. 8, diagram 66 shows an orientation angle, θ, of 11.25° where α=0.040. Diagram 68 shows an orientation angle, θ, of 22.5° where α=0.172. Finally, diagram 70 shows an orientation angle, θ, of 45° where α=1.0. A fiber undergoing the flows is shown as the darker line.

An example of an inlet/outlet control element that can implement this type of flow control. The slots at the ends of the channel serve as the fluidic inlets/outlets for the flow orientation system. Fibers transported down the central circular channel will decelerate and orient parallel to the exit plane as they enter the inlet/outlet region. The mixed flow generated at the junction contributes to the deceleration but primarily rotates the fiber until it orients along the principal straining axis. This axis is controlled by the flow parameter, which is modulated by appropriately choosing inlet and outlet flow rates in the slots.

Figure 9:
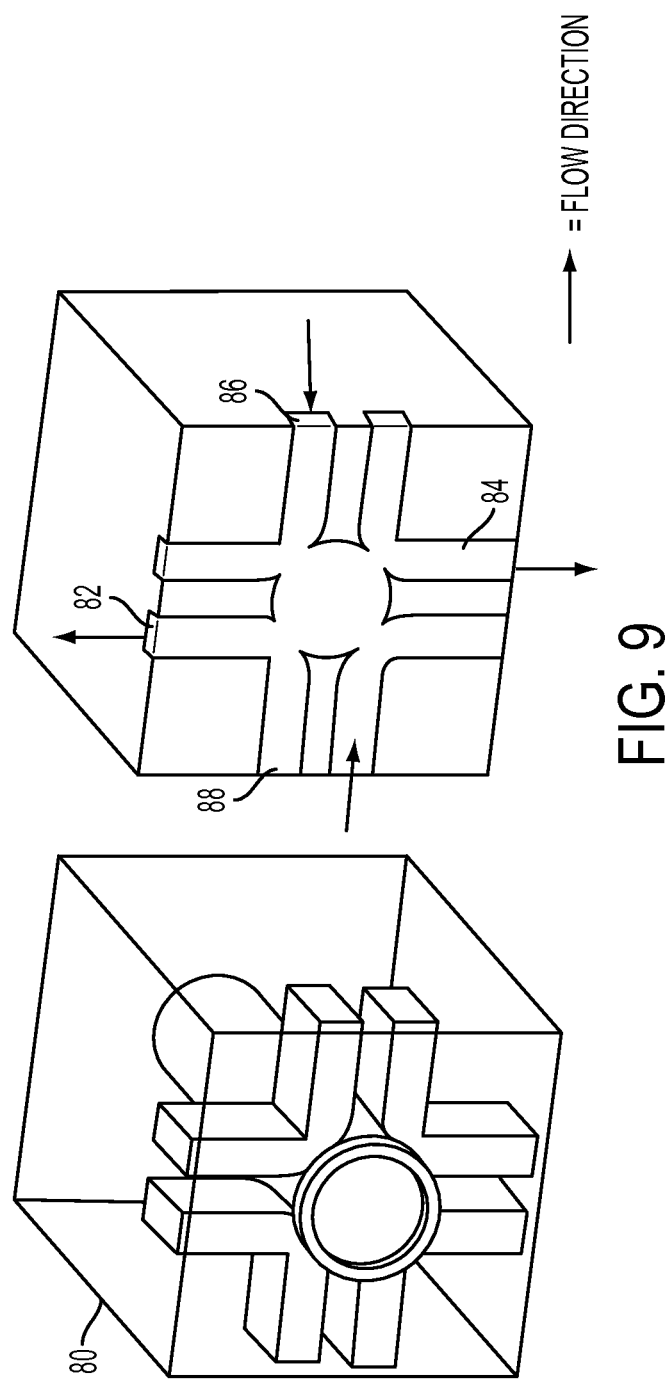
FIG. 9 shows views of an embodiment of an inlet/outlet component.

In FIG. 9, the fluidic channel system 80 is designed to control fiber orientation. The slots 86 and 88 are the inlets for the orienting flow, and the slots 82 and 84 are the outlets as shown in the cutaway view. For fibers smaller than the deposition orifice, the fiber orientation can be dynamically modulated at any given point in space by varying the mixed flow control profile just prior to extrusion. For larger fibers, the flow in the slots is stopped and the fiber is deposited in a direction parallel to the nozzle. Orientation control of these larger fibers is possible when the print head is coupled to a three-dimensional deposition tool, such as the actuator 18 of FIG. 2.

The oriented particles are deposited in a three-dimensional digital manner in order to facilitate arbitrary particle alignment and material composition. The system of FIG. 1 has a flexibility that makes it possible to vary fiber orientation and concentration in a nearly arbitrary manner using different techniques depending on the fiber scale. The deposition has the ability to dynamically change the angle of deposition relative to the substrate. The actuator 18 of FIG. 2 moves through all 6 axes.

Figure 10:
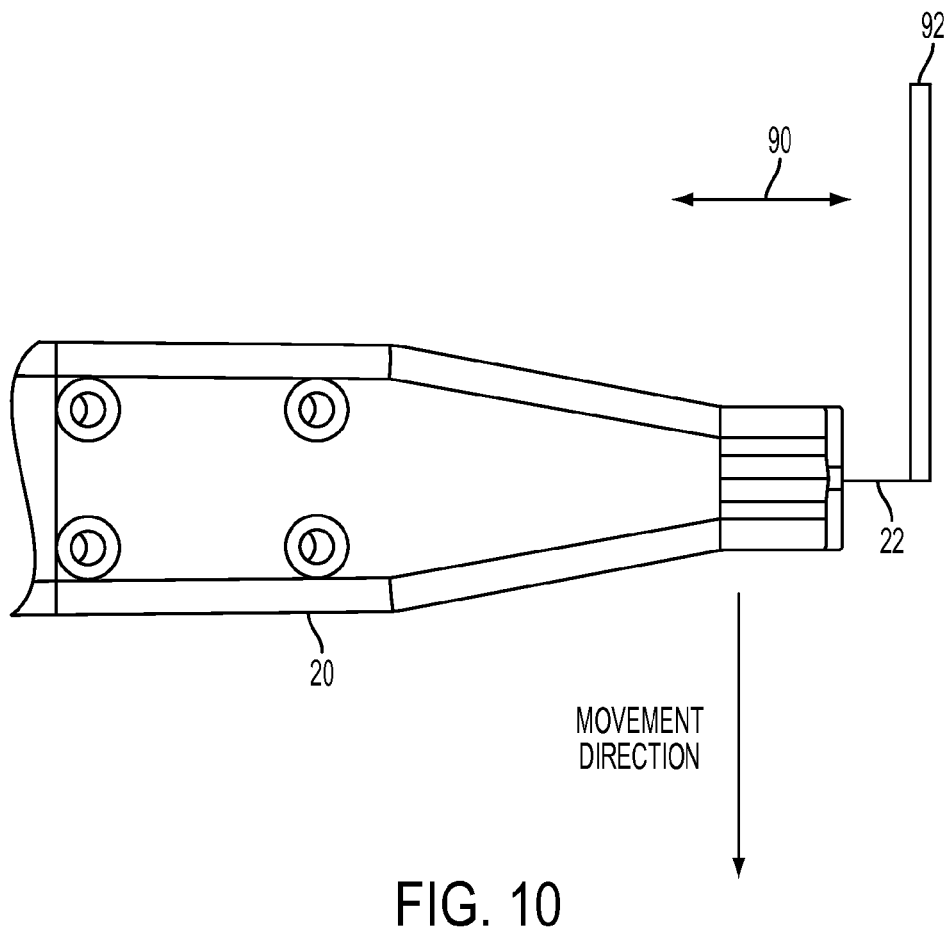
FIGS. 10-11 views of an exit nozzle of a print head.
Figure 11:
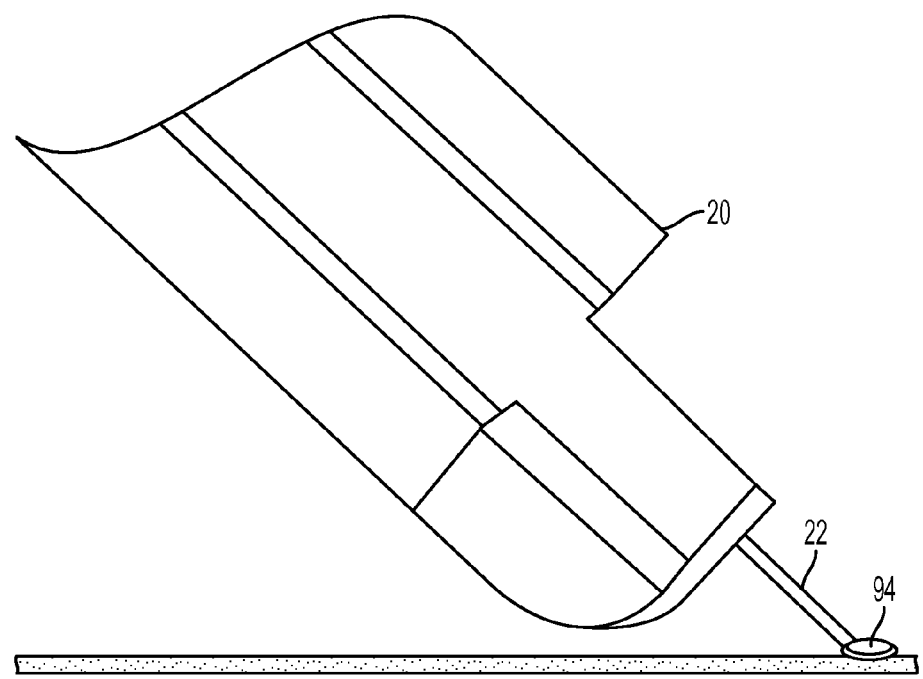

Depending on the fiber length and nozzle diameters, some fibers may not be able to flow through the nozzle without deviating from their target orientation. In those instances, the orientation of the exit nozzle is altered, regardless of the direction of the movement. FIGS. 10 and 11 show views of the exit nozzle. FIG. 10 shows a view from above the nozzle as it deposits a fiber larger than the exit orifice. FIG. 11 shows a view of a cross section perpendicular to the direction of motion of the nozzle.

In some applications, the choice of resin is an important parameter in enabling a digital workflow. In one embodiment, the resin may be UV-curable thermoset polymers that utilize acrylate linking groups bonded to traditional thermoset monomers. These polymers possess many of the positive qualities of traditional thermosets but with the ease of UV processing. These chemistries make digital structures possible using rasterized deposition followed by partial UV curing in a manner similar to existing inkjet-based three-dimensional printing. Alternatively, the system could use non-UV thermoset chemistry, such as an epoxy.

This system allows for unprecedented control of fiber orientation and concentration. This system also allows for digital tailoring of mechanical properties via the use of hierarchical resin systems employing variable amorphous and crystalline polymer domains and/or nanocomposite reinforcement used in combination with macroscopic fiber reinforcement.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system to fabricate hierarchical graded materials, comprising:
   a reservoir to contain a material to be deposited; and
   a print head connected to the reservoir by a conduit to allow the print head to receive the material to be deposited, the print head having a mixer to mix the material to be deposited with mixed fluid volume control no larger than a characteristic voxel size, wherein a voxel is a three-dimensional droplet of the material, and a fluid particle alignment section to receive the material from the mixer, the fluid particle alignment section to align fibers within the material to have arbitrary alignment relative to at least one nozzle, wherein the nozzle is connected to the fluid particle alignment section.

2. The system of claim 1, the print head further comprising a reactive binding section between the mixer and the fluid particle alignment section, the reactive binding section to cause binding of particles within the materials to link together.

3. The system of claim 2, the reactive binding section further comprising a stimulus, the stimulus applied to the material in the reactive binding section to cause the particles to link together.

4. The system of claim 3, wherein the stimulus comprises one of a heater and a light source.

5. The system of claim 1, the print head further comprising a flow focusing section to receive materials from the mixer and create coaxial flow of the material.

6. The system of claim 5, wherein the flow focusing section comprises a three-input flow section.

7. The system of claim 1, wherein the mixing section comprises a low volume mixer with a characteristic volume on an order of a voxel, such that homogeneous mixing is performed in a volume of fluid equal to a volume of a voxel in a time equal to one of either a size of the voxel divided by a volumetric material deposition rate or the characteristic volume of the mixer divided by the volumetric material deposition rate, such that the residence time distribution of material in said mixer is equal to the voxel size divided by volumetric material deposition rate.

8. The system of claim 1, further comprising one of a UV or thermal curing fixture.

\* \* \* \* \*